Figure 1:
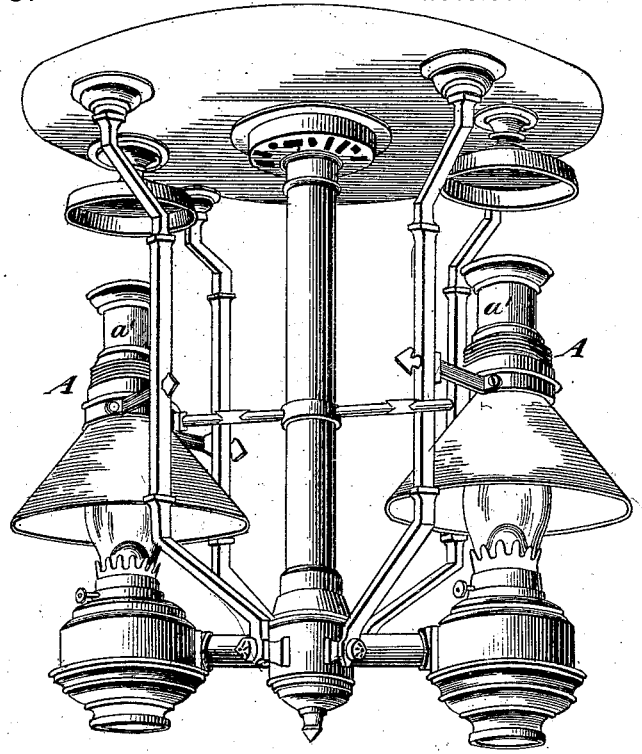

(Model.) 3 Sheets—Sheet 1.

W. H. BRIGGS & W. ROBINSON.
LAMP.

No. 272,203. Patented Feb. 13, 1883.

Witnesses.
A. Ruppert.
W. F. Cole

Inventors.
William H. Briggs,
William Robinson
by Htt W. J. Howard (Model.) 3 Sheets—Sheet 2.

W. H. BRIGGS & W. ROBINSON.
LAMP.

No. 272,203. Patented Feb. 13, 1883.

Witnesses.
A. Ruppert.
W. T. Cole.

Inventors.
William H. Briggs,
William Robinson,
by G. H. W. T. Howard
attys.

(Model.) 3 Sheets—Sheet 3.
W. H. BRIGGS & W. ROBINSON.
LAMP.
No. 272,203. Patented Feb. 13, 1883.
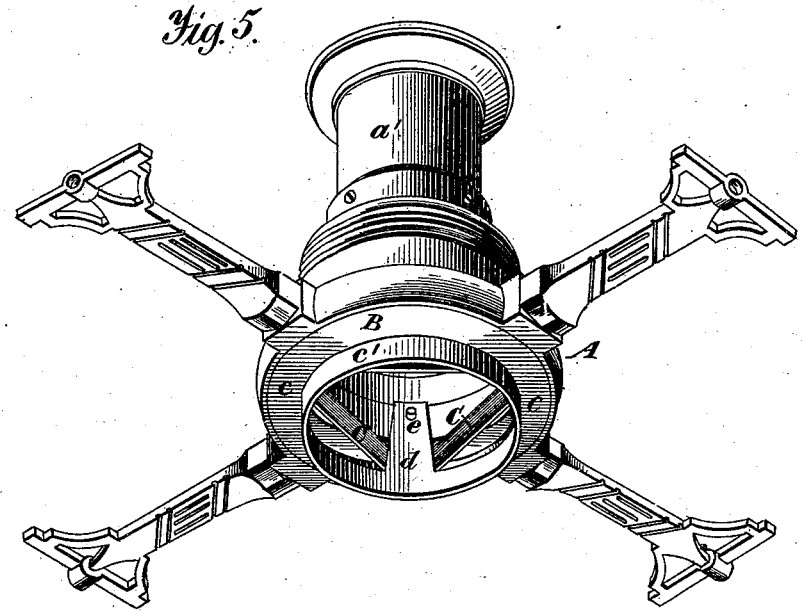
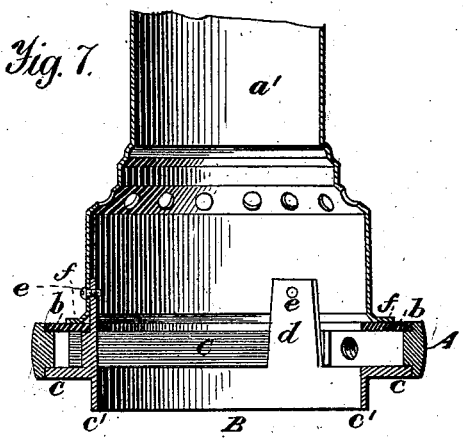
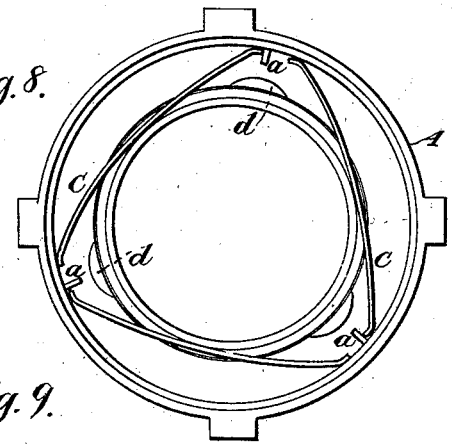
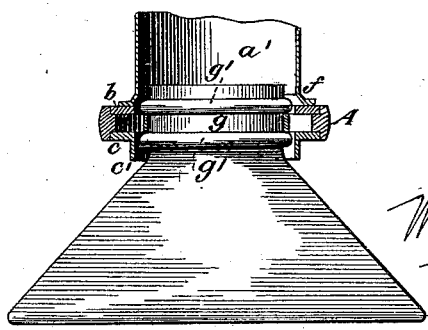
Witnesses.
A. Ruppert.
W. T. Cole
Inventors.
William H. Briggs,
William Robinson
by G. H. W. T. Howard
atty.

UNITED STATES PATENT OFFICE.

WILLIAM H. BRIGGS AND WILLIAM ROBINSON, OF CHICAGO, ILLINOIS, ASSIGNORS TO THE ADAMS & WESTLAKE MANUFACTURING COMPANY OF MICHIGAN.

LAMP.

SPECIFICATION forming part of Letters Patent No. 272,203, dated February 13, 1883.

Application filed November 9, 1882. (Model.)

*To all whom it may concern:*

Be it known that we, WILLIAM H. BRIGGS and WILLIAM ROBINSON, both of Chicago, in the county of Cook and State of Illinois, have invented certain Improvements in Lamps, of which the following is a specification, reference being had to the accompanying drawings, and to the letters of reference marked thereon.

This invention has special reference to improvements in various classes of car-lamps—as chandeliers, center and side lamps, &c.—and relates to a fastening or coupling whereby to unite the oil reservoir or fount to its frame, the cap of the reservoir or fount to its case, or the shade to its gallery. The invention is also applicable to candle chandeliers and lamps, for fastening or coupling the candle-holder in its socket, as also to the coupling or fastening generally of various parts of a lamp.

The invention consists of a suitable fixed annular support provided with inwardly-projecting ribs or abutments, and a series of independent spring-plates with their ends in proper relation to said abutments, and arranged horizontally within the annular support in a manner to form a contracted elastic socket of polygonal or non-annular shape, combined with a cylindrical holder having vertical standards placed in the angles formed by the approach of any two of the spring-plates, and which cylindrical holder is capable of limited rotation within the fixed annular support, and when so rotated, either to the right or to the left, shall, by the radial sliding of the standards against the spring-plates, cause the latter as a series to be curved and expanded to a shape adapting them to receive the oil-reservoir, shade, or other part of a lamp, usually cylindrical, which series, on the cylindrical holder being relieved from torsional strain, in seeking to recover their normal position, shall spring or close around the reservoir or shade and hold it in position to be removed, when desired, by again subjecting the cylindrical holder to torsional strain, thereby enlarging the elastic socket and loosening it from the part to be removed.

Figure 2:
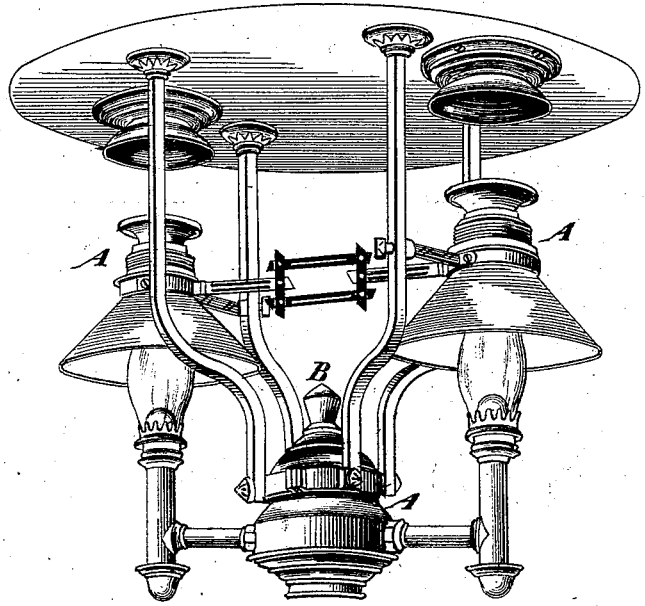
Figure 3:
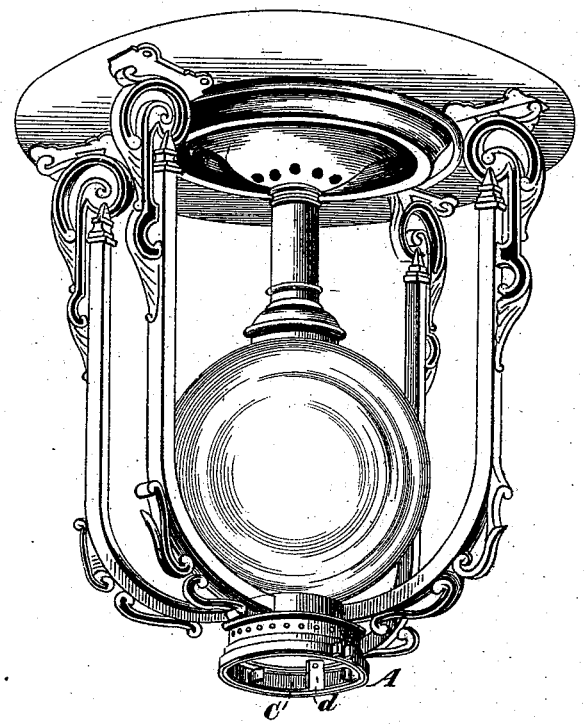
Figure 4:
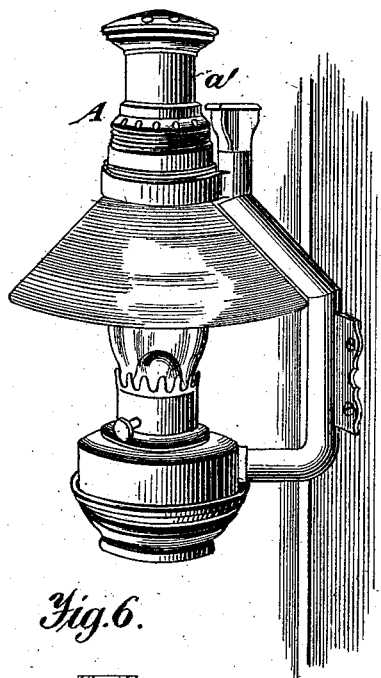
Figure 6:
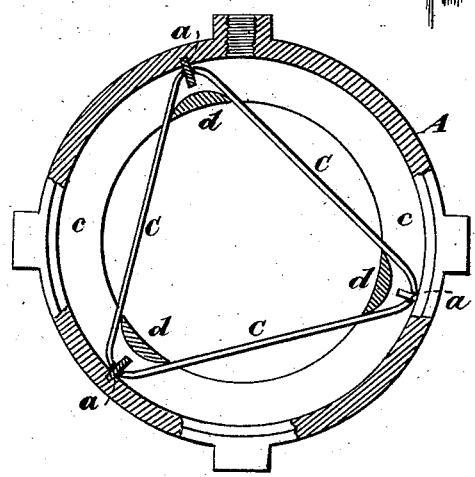

In the accompanying drawings, Figures 1 and 2 are perspective views of chandeliers, showing the parts or places to which the invention may be applied. Fig. 3 is a perspective view of a center lamp for burning candles, showing the application of the invention, the candle socket or holder being represented as detached from the frame. Fig. 4 is a perspective view of a side lamp with which the invention is incorporated. Fig. 5 is a perspective view on enlarged scale, showing the application of the invention to that part of a lamp of the class exhibited by Figs. 1 and 2, which encircles or holds the shade, the spring-plates forming the elastic socket being in their contracted or unextended condition. Fig. 6 is a sectional plan on the central line of the spring-plates shown in Fig. 5. Fig. 7 is a vertical sectional elevation of the part of the lamp shown in Fig. 5. Fig. 8 is an outline plan view, showing the manner in which the elastic socket may be made to encircle a cylindrical object. Fig. 9 is a view of the shade as held by the invention.

Similar letters of reference indicate similar parts in the respective figures.

Referring more particularly to Figs. 5, 6, and 7, A is the fixed annular support, and B the cylindrical holder. At the inner circumference of the support A are abutments *a*, fitted into the ring, and against which the curved ends of the spring-plates C rest when in their normal or contracted position, as shown in Fig. 6. The cylindrical holder is composed of the cap-piece *a'*, the ring *b*, and the base-ring *c*, the latter having the vertical flange *c'*, which fits around the top of the shade. The parts *a'* and *c* are united by means of the standards *d* and screws *e*, the ring *b* being held between the bottom flange, *f*, of the part *a'* and the fixed support A. The spring-plates C are placed within the vertical space between the base-ring *c* and the intermediate ring, *b*. The standards *d*, when in the normal position indicated in Fig. 6, rest in the angles formed at the meeting-points of the spring-plates. It is evident, the annular support A being fixed, that on turning the cylindrical holder to the right or left, the standards *d*, sliding upon the spring-plates C, will force or spring them back into the vertical space in which they are confined. The spring-plates are thus given a slight curvature, causing the series to form approximately the shape shown in Fig. 8. It is only necessary, however, that the spring-plates be expanded sufficiently to receive the object to be introduced. On the operator removing his hand from the cylindrical holder, the spring-plates immediately seek to resume their normal position, and grasp the shade or other object entering the space $g$ between the beads $g'$ $g'$, as shown in Fig. 9. To remove the shade, the cylindrical holder is slightly revolved, further expanding the spring-plates and releasing the shade from their grasp, when it may be lifted out.

The construction may be varied in some minor particulars to adapt the invention for coupling other parts of the lamp, as the reservoir or fount to its frame or the cap of the reservoir to its case; but in all applications the general features remain the same, it being necessary that there shall be a stationary part, a series of spring-plates, and a revolving part with standards or their equivalent, which in their rotation shall slide upon the plates and expand them.

It is not necessary to the invention that the spring-plates shall be three in number, or that they shall be straight, as they may be of any suitable number or shape which will allow of the formation of angles upon which the standards or their equivalent may operate to produce the expansion.

The term "cylindrical holder," employed throughout the foregoing specification, will not apply to all the adaptations of which the invention is susceptible, but is adopted as a convenient term for purposes of description. It is to be here understood that by said term is meant that part of the coupling which is adapted to partially rotate, and to which is attached as parts thereof the standards or their equivalent, which, in the act of rotating, bear against and effect the expansion of the spring-plates.

While it is stated that the cylindrical holder is capable of partial rotation, it is to be noticed that it may be entirely revolved, although no necessity exists for rotating it beyond a limited extent.

We claim as our invention—

1. As a lamp-coupling, an elastic socket consisting of a series of spring-plates arranged in a horizontal plane to form a polygonal or multangular figure, and adapted to be expanded and to spring against or upon an object inserted vertically within said series, substantially as and for the purposes set forth.

2. In a lamp-coupling, a fixed annular support having abutments, combined with a series of spring-plates, and a cylindrical holder capable of rotation, having standards or their equivalent placed in engagement with said spring-plates, and adapted during the act of partial rotation to slide against or upon the same and cause their expansion, substantially as and for the purposes set forth.

3. In a lamp-coupling, a fixed annular support having abutments, combined with a series of spring-plates, forming, when unexpanded, a polygonal or non-annular figure, and a cylindrical holder capable of rotation, having standards or their equivalent placed in engagement with said spring-plates, and adapted during the act of partial rotation to slide against or upon the same and cause their expansion, substantially as and for the purposes set forth.

In testimony whereof we have hereunto set our hands and seals this 23d day of October, 1882.

WILLIAM H. BRIGGS. [L. S.]
WILLIAM ROBINSON. [L. S.]

Witnesses:
I. VAN HAGEN,
I. HENRY GILS.